(12) United States Patent
Wang

(10) Patent No.: US 12,374,077 B2
(45) Date of Patent: Jul. 29, 2025

(54) FACIAL IMAGE PROCESSING METHOD AND APPARATUS, COMPUTER DEVICE, AND MEDIUM

(71) Applicant: ZTE Corporation, Shenzhen (CN)

(72) Inventor: Jindong Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 743 days.

(21) Appl. No.: 17/610,315

(22) PCT Filed: Sep. 21, 2020

(86) PCT No.: PCT/CN2020/116526
§ 371 (c)(1),
(2) Date: Nov. 10, 2021

(87) PCT Pub. No.: WO2021/109680
PCT Pub. Date: Jun. 10, 2021

(65) Prior Publication Data
US 2022/0245962 A1    Aug. 4, 2022

(30) Foreign Application Priority Data
Dec. 6, 2019   (CN) .......................... 201911244817.2

(51) Int. Cl.
*G06V 10/74* (2022.01)
*G06F 16/583* (2019.01)
*G06V 10/77* (2022.01)
*G06V 10/772* (2022.01)
*G06V 10/98* (2022.01)
(Continued)

(52) U.S. Cl.
CPC ............ *G06V 10/74* (2022.01); *G06F 16/583* (2019.01); *G06V 10/7715* (2022.01); *G06V 10/772* (2022.01); *G06V 10/98* (2022.01); *G06V 40/168* (2022.01); *G06V 40/171* (2022.01); *G06V 40/50* (2022.01)

(58) Field of Classification Search
None
See application file for complete search history.

(56) References Cited

U.S. PATENT DOCUMENTS 8,811,683 B2   8/2014   Zimmer
2012/0294533 A1  11/2012   Ikenoue

FOREIGN PATENT DOCUMENTS

CN   101968849 A   2/2011
CN   107437048 A   12/2017
(Continued)

OTHER PUBLICATIONS

Yang, Fei et al, Expression flow for 3D-aware face component transfer. (Year: 2011).*
(Continued)

*Primary Examiner* — Chan S Park
*Assistant Examiner* — Elisa M Rice
(74) *Attorney, Agent, or Firm* — Vivacqua Crane, PLLC

(57) ABSTRACT

Provided are a method and an apparatus for facial image processing, a computer device and a medium. The method for facial image processing includes acquiring a facial image to be optimized of a target user, acquiring a reference facial image matched with the facial image to be optimized from a preset face database, and optimizing the facial image to be optimized according to the reference facial image.

5 Claims, 3 Drawing Sheets

(51) Int. Cl.
*G06V 40/16* (2022.01)
*G06V 40/50* (2022.01)

(56) References Cited

FOREIGN PATENT DOCUMENTS

| | | | |
|---|---|---|---|
| CN | 107862657 | A | 3/2018 |
| CN | 109302628 | A | 2/2019 |
| CN | 109360170 | A | 2/2019 |
| CN | 109858355 | A | 6/2019 |
| CN | 109919830 | A | 6/2019 |
| CN | 109919866 | A * | 6/2019 |
| CN | 109978754 | A | 7/2019 |
| CN | 110020578 | A | 7/2019 |
| CN | 110163806 | A | 8/2019 |
| CN | 110263737 | A | 9/2019 |
| CN | 111105369 | A | 5/2020 |
| CN | 111553864 | A | 8/2020 |
| WO | 2019114508 | A1 | 6/2019 |

OTHER PUBLICATIONS

Zhang et al ("FaceSwapNet: Landmark Guided Many-to-Many Face Reenactment"). (Year: 2019).*
Bazin, et al. "Automatic Closed Eye Correction," 16th IEEE International Conference on Image Processing (ICIP), 2009, pp. 2433-2436.
European Patent Office. Extended European Search Report for EP Application No. 20896073.2, mailed Jun. 29, 2022, pp. 1-11.
Intellectual Property India. Examination Report for IN Application No. 202127058867 and English translation, mailed Aug. 18, 2022, pp. 1-7.
International Searching Authority. International Search Report and Written Opinion for PCT Application No. PCT/CN2020/116526 and English translation, mailed Dec. 23, 2020, pp. 1-11.
The State Intellectual Property Office of People's Republic of China. First Office Action for CN Application No. 201911244817.2 and English translation, mailed Aug. 26, 2024, pp. 1-10.
The State Intellectual Property Office of People's Republic of China. First Search Report for CN Application No. 201911244817.2 and English translation, mailed Aug. 26, 2024, pp. 1-8.

* cited by examiner

FACIAL IMAGE PROCESSING METHOD AND APPARATUS, COMPUTER DEVICE, AND MEDIUM

CROSS-REFERENCE TO RELATED APPLICATION

This application is a national stage filing under 35 U.S.C. § 371 of international application number PCT/CN2020/116526, filed Sep. 21, 2020, which claims priority to Chinese patent application No. 201911244817.2, filed Dec. 6, 2019. The contents of these applications are incorporated herein by reference in their entireties.

TECHNICAL FIELD

The present disclosure relates to the technical field of image processing, and in particular to, a method and an apparatus for facial image processing, a computer device, and a non-transitory computer-readable storage medium.

BACKGROUND

In intelligent terminal devices (e.g., intelligent phones, etc.), photographing has become an indispensable application function, and users can take self-portraits by the photographing function.

When taking photos with an intelligent terminal device, a user is often affected by factors such as the terminal device, ambient light and photographing target, which may lead to imperfect photographed facial images. Some minor defects in the facial images may be corrected by photo retouching software installed in the intelligent terminal device. However, for some facial images which are blurred due to focus failure, overexposed or lack of light, the image processing software of some intelligent terminal devices cannot fulfill the optimization requirements, and these facial images can only be optimized by professional image processing software.

SUMMARY

According to the present disclosure, a method and apparatus for facial image processing, a computer device and a non-transitory computer-readable storage medium are provided for automatic optimization of defective facial images.

In a first aspect, according to an embodiment of the present disclosure, a method for facial image processing may include acquiring a facial image to be optimized of a target user, acquiring a reference facial image matched with the facial image to be optimized from a preset face database, and optimizing the facial image to be optimized according to the reference facial image.

In a second aspect, according to an embodiment of the present disclosure, an apparatus for facial image processing may include a to-be-optimized facial image acquisition module configured to acquire a facial image to be optimized of a target user, a reference facial image acquisition module configured to acquire a reference facial image matched with the facial image to be optimized from a preset face database, and an image optimization module configured to optimize the facial image to be optimized according to the reference facial image.

In a third aspect, according to an embodiment of the present disclosure, a computer device may include at least one processor and a storage device storing at least one program. When executed by the at least one processor, the at least one program causes the at least one processor to perform the method for facial image processing described in any one of the embodiments of the present disclosure.

In a fourth aspect, according to an embodiment of the present disclosure, a non-transitory computer-readable storage medium store computer programs which, when executed by a processor, cause the processor to perform the method for facial image processing described in any of the embodiments of the present disclosure.

More description of the above embodiments and other aspects of the present disclosure and the implementations thereof will be provided in following sections.

DETAILED DESCRIPTION

In order to make the objectives, technical schemes and advantages of the present disclosure clearer, the embodiments of the present disclosure will be described in detail below with reference to the accompanying drawings. It is to be noted that, the embodiments in the present disclosure and the features in the embodiments can be arbitrarily combined with each other if not conflicted.

Figure 1:
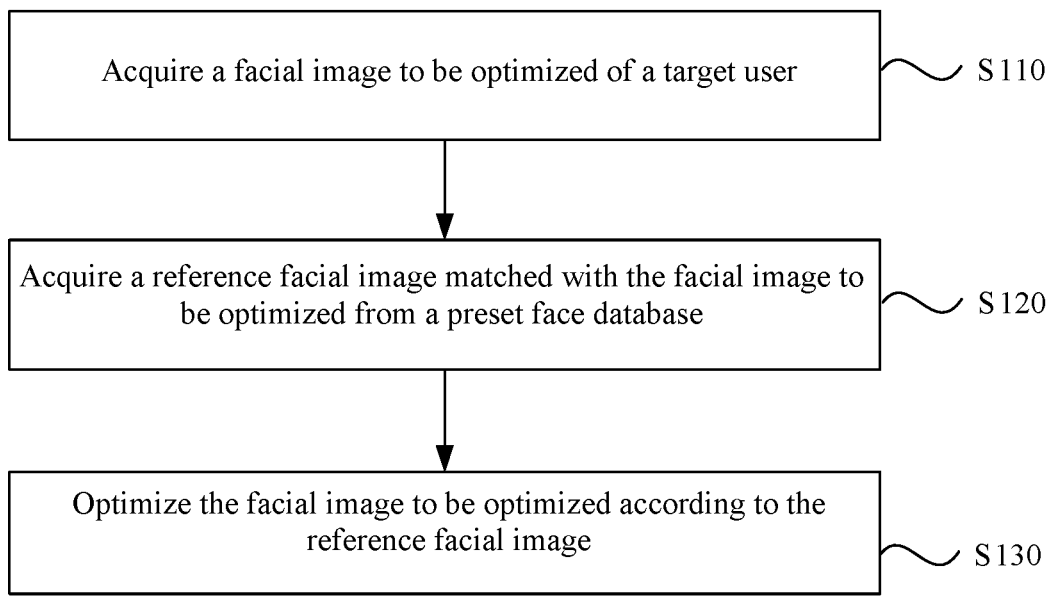
FIG. 1 is a schematic flowchart of a method for facial image processing according to an embodiment of the present disclosure.

FIG. 1 is a schematic flowchart of a method for facial image processing according to an embodiment of the present disclosure. For example, the method can be applied in an environment where an intelligent terminal device is configured to automatically optimizes defective facial images. The method can be executed by the apparatus for facial image processing provided by the present disclosure. The apparatus for facial image processing can be implemented by software and/or hardware and integrated on an intelligent terminal device (for example, various intelligent phones, tablet computers, personal computers, etc.).

As shown in FIG. 1, the method for facial image processing provided by the present disclosure includes steps S110, S120 and S130.

At step S110, a facial image to be optimized of a target user is acquired.

The target user is a user who uses an intelligent terminal device to acquire facial images. In some examples, the target user can be a user who has a permission of unlocking the intelligent terminal. The unlocking permission includes, but not limited to, fingerprint unlocking, face recognition unlocking, password unlocking or the like. The facial image to be optimized can be a facial image that has defects and needs to be optimized. The defects may include image blur caused by focus failure, overexposure, excessive darkness, eye closure or face distortion, etc. Such defects cannot be repaired by the photographing function of the intelligent terminal device.

In the embodiments of the present disclosure, the intelligent terminal device can acquire the facial image of the target user by its photographing function, where the photographing function includes a self-photographing function and non-self-photographing function. Alternatively, the intelligent terminal device can also acquire the facial image of the target user according to a specified or selected operation of the target user. If the facial image designated by the target user through the photo album, gallery or other applications (APPs) is used as the facial image of the target user, the way of acquiring the facial image of the target user by the intelligent terminal device will not be limited in the embodiments of the present disclosure.

In an embodiment of the present disclosure, the acquiring a facial image to be optimized of a target user may include acquiring a facial image of a target user, detecting defects of the facial image, and determining the facial image as the facial image to be optimized when it is determined that there are facial defects in the facial image.

In the embodiments of the present disclosure, after the facial image of the target user is acquired, facial defects in the facial image may be detected; and, when it is determined according to a result of detection that there are facial defects to be repaired in the facial image, the facial image having facial defects is taken as the facial image to be optimized of the target user.

At step S120, a reference facial image matched with the facial image to be optimized is acquired from a preset face database.

The reference facial image is an unlocking facial image used by the target user for face unlocking and/or a standard facial image stored by the target user.

The preset face database may be a database pre-established for the target user to store the unlocking facial image of the target user and/or the standard facial image stored by the target user. The unlocking facial image may be an image involved in face recognition unlocking. For example, the unlocking facial image may be a facial image acquired by the intelligent terminal device when the target user performs face recognition unlocking on the intelligent terminal device, or a standard facial image that is pre-stored in the intelligent terminal device and used to compare with the image of the target user captured for face recognition unlocking.

Alternatively, it is also possible that both the acquired facial image and the standard facial image are used as unlocking facial images, that is, the facial images used for face unlocking can be used as unlocking facial images. The way of acquiring unlocking facial images will be not limited in the embodiments of the present disclosure. The standard facial image stored by the target user may be a facial image pre-acquired by the target user through the photographing function, downloading function or picture saving function, and used for image optimization. For example, the self-portraits stored by the target user in the local photo album and subjected to image optimization can be used as the reference facial image.

It should be understood that, with the maturity and wide application of the face recognition technology, intelligent terminal devices can be configured with a face recognition unlocking function. The unlocking facial images used by the face recognition unlocking function are often clear standard facial images, so the unlocking facial images can be used as the reference facial image. Meanwhile, during the use of the intelligent terminal device, the target user will save personal standard facial images by various image acquisition means such as the photographing function, the downloading function or the picture saving function. These standard facial images are also generally clear standard facial images, so the standard facial images stored by the target user can be used as the reference facial image.

At step S130, the facial image to be optimized is optimized according to the reference facial image.

Correspondingly, the facial image to be optimized can be optimized according to the standard reference facial image.

Since there are no defects such as image blur caused by focus failure, overexposure, excessive darkness, eye closure or face distortion in the unlocking facial image and the standard facial image stored by the target user, when the facial image to be optimized is optimized by using the unlocking facial image and/or the standard facial image stored by the target user as the reference facial image, the defects such as image blur caused by focus failure, overexposure, excessive darkness, eye closure or face distortion in the facial image to be optimized can be repaired.

In the embodiments of the present disclosure, a facial image to be optimized of a target user is acquired, a facial image matched with the facial image to be optimized is acquired from a preset face database as a reference facial image, and the facial image to be optimized is optimized according to the reference facial image, the problem that some defective facial images cannot be optimized by the existing intelligent terminal devices is solved, and therefore the automatic optimization for the defective facial images is realized.

Based on the above embodiment, variant embodiments of the above embodiment are provided. Here, it is to be noted that, for simplicity of description, only differences from the above embodiments are described in the variant embodiments.

In an example, before the reference facial image matched with the facial image to be optimized is acquired from the preset face database, the method may include: acquiring a facial image of the target user collected during face unlocking as the unlocking facial image; and/or, acquiring a standard facial image of the target user, which is used in comparison with the facial image collected during face unlocking, as the unlocking facial image; acquiring a standard facial image stored by the target user; and, establishing the preset facial database according to the unlocking facial image and/or the standard facial image stored by the target user.

It should be understood that, since the standard facial image used for face unlocking is used in comparison with the facial image of the target user collected during face unlocking, the standard facial image used for face unlocking will not include defects such as image blur caused by focus failure, overexposure, excessive darkness, eye closure or face distortion, and the five sense organs and facial expression in the standard facial image used during face unlocking will satisfy the preset standard requirements of the intelligent terminal device. Since the facial image of the target user collected during face unlocking is used for unlocking, generally, the target user will pay attention to keeping the preciseness of the facial features to ensure that the success of unlocking. Therefore, the facial image the target user acquired during face unlocking generally will not include defects such as image blur caused by focus failure, overexposure, excessive darkness, eye closure or face distortion. Therefore, the facial image of the target user collected during face unlocking can be used as the unlocking facial image; and/or, the standard facial image of the target user used in comparison with the collected facial image during face unlocking can be used as the unlocking facial image. Meanwhile, it is also possible that the standard facial image stored by the target user is acquired, for example, the standard facial image stored by the target user is acquired from the local photo album or the cloud photo album corresponding to the target user, and the corresponding preset face database is established according to the unlocking facial image and/or the standard facial image stored by the target user.

It is to be noted that, there may be one or more target users, and a user having a face recognition unlocking permission on the intelligent terminal device can be a target user, so it will not be limited in the embodiments of the present disclosure.

In an example, the step of establishing the preset facial database according to the unlocking facial image and/or the standard facial image stored by the target user may include screening the unlocking facial image and/or the standard facial image stored by the target user according to a facial image screening condition to obtain a facial image sample, and adding the facial image sample to the preset face database. The facial image sample includes the unlocking facial image and/or the standard facial image stored by the target user and at least one feature value of the unlocking facial image and/or the standard facial image stored by the target user.

The facial image screening condition can be a condition for screening the unlocking facial image and/or the standard facial image stored by the target user to obtain a high-quality facial image. For example, the facial image screening condition may be clear image, no eye closure, the face being not blocked, or the like, which will not be limited in the embodiments of the present disclosure.

In order to further ensure the quality of facial images in the preset face database, the acquired unlocking facial image and/or the standard facial image stored by the target user can be screened according to the facial image screening condition. This is because the feature values such as angle or brightness associated with the standard facial images in the unlocking facial images or the standard facial images stored by the target user may not be unique. For example, for one target user, in the intelligent terminal device there may be a plurality of standard facial images stored, respectively corresponding to a plurality of unlocking facial images taken from different angles. In addition, in view of the variability of the unlocking scenario, the face brightness, angle and facial emotion of the target user are different during each unlocking process. Alternatively, a plurality of standard facial images taken from different angles are stored by the target user in the intelligent terminal device. Therefore, after the unlocking facial images and/or the standard facial images stored by the target user is acquired, the unlocking facial images and/or the standard facial images stored by the target user can be screened according to the facial image screening condition to obtain a high-quality facial image as a facial image sample. The facial image sample may include one or more unlocking facial images and at least one feature value corresponding to each unlocking facial image, and/or include standard facial images stored by one or more target users and at least one feature value corresponding to the standard facial image stored by each target user. The feature value is used to indicate the features of the facial image, and may include, but not limited to, image resolution, angle value, brightness value, facial expression, five sense organs, facial contour or the like, which will not be limited in the embodiments of the present disclosure. Correspondingly, after the facial image sample is acquired, the facial image sample can be added to the preset face database to complete the establishment of the preset face database. In some examples, the facial image sample may include a plurality of facial image samples taken from different face angles of the target user.

It is to be noted that, when in use, the intelligent terminal device can always acquire the unlocking facial image and/or the standard facial image stored by the target user, so that the preset face database can also be updated, the locally stored unlocking facial image and/or the standard facial image stored by the target user are updated at a preset period (e.g., one week, etc.) with the facial images newly acquired by the intelligent terminal device (the unlocking facial image and/or the standard facial image stored by the target user), thereby ensuring the optimization effect of the facial image.

In an example, the feature value may include an angle value. The step of acquiring a reference facial image matched with the facial image to be optimized from a preset face database may include: acquiring, according to the angle value of the facial image to be optimized and from the preset face database, a facial image matched with the facial image to be optimized in angle value to serve as the reference facial image.

The angle value may be any angle value based on the XYZ axis.

According to an embodiment of the present disclosure, when the reference facial image matched with the facial image to be optimized is acquired from the preset face database, the angle value in the face image may be considered, and the facial image with a similar face angle can be taken as a reference facial image. The advantage of doing so may include: the facial image to be optimized has various face angles, and the facial image can also involve a plurality face angles of the target user. Therefore, by acquiring, according to the angle value of the facial image to be optimized and from the preset face database, a facial image matched with the facial image to be optimized in terms of angle value as the reference facial image, the optimization effect of the facial image can be ensured.

In an embodiment, if it is assumed that the facial image to be optimized is a front facial image of the target user, the unlocking facial image taken when the front side of the target user faces the intelligent terminal device and/or the standard facial image of the front face stored by the target user can be acquired as a reference facial image. If it is assumed that the facial image to be optimized is a left facial image of the target user, the unlocking facial image taken when the left side of the target user faces the intelligent terminal device and/or the standard facial image of the left side stored by the target user can be acquired as a reference facial image. By selecting the unlocking facial image as a reference facial image according to the angle value, the degree of matching of the reference facial image and the facial image to be optimized can be effectively ensured, and the optimization effect of the facial image can be further ensured.

In an embodiment, the step of optimizing the facial image to be optimized according to the reference facial image may include: extracting feature values of the reference facial image and the facial image to be optimized, and optimizing the feature value of the facial image to be optimized according to the feature value of the reference facial image.

In the embodiments of the present disclosure, during the optimization of the facial image to be optimized, the feature values of the reference facial image and the facial image to be optimized can be extracted, respectively, so that the feature value of the facial image to be optimized is optimized according to the feature value of the reference facial image.

In an embodiment, the feature value may further include at least one of image resolution, brightness value, facial expression, five sense organs and facial contour. Correspondingly, the step of optimizing the feature value of the facial image to be optimized according to the feature value of the reference facial image may include: optimizing the image resolution of the facial image to be optimized according to the image resolution of the reference facial image; optimizing the brightness value of the facial image to be optimized according to the brightness value of the reference facial image; optimizing the facial expression of the facial image to be optimized according to the facial expression of the reference facial image; optimizing the five sense organs of the facial image to be optimized according to the five sense organs of the reference facial image; or, optimizing the facial contour of the facial image to be optimized according to the facial contour of the reference facial image.

In an embodiment, the step of optimizing the image resolution of the facial image to be optimized according to the image resolution of the reference facial image may include: repairing the image resolution of the facial image to be optimized according to the image resolution of the reference facial image when the image resolution of the facial image to be optimized satisfies a first face repair condition; the step of optimizing the brightness value of the facial image to be optimized according to the brightness value of the reference facial image may include: repairing the brightness value of the facial image to be optimized according to the brightness value of the reference facial image when the brightness value of the facial image to be optimized satisfies a second face repair condition; the step of optimizing the facial expression of the facial image to be optimized according to the facial expression of the reference facial image may include: repairing the facial expression of the facial image to be optimized according to the facial expression of the reference facial image when the facial expression of the facial image to be optimized satisfies a third face repair condition; the step of optimizing the five sense organs of the facial image to be optimized according to the five sense organs of the reference facial image may include: repairing the eye feature of the facial image to be optimized according to the eye feature of the reference facial image when the eye feature of the facial image to be optimized satisfies a fourth face repair condition; and, the step of optimizing the facial contour of the facial image to be optimized according to the facial contour of the reference facial image may include: repairing the facial contour of the facial image to be optimized according to the facial contour of the reference facial image when the facial contour of the facial image to be optimized satisfies a fifth face repair condition.

The first face repair condition may be a condition for determining whether the image resolution of the facial image to be optimized satisfies the repair optimization. For example, the first face repair condition may be that the image resolution of the facial image to be optimized is less than a first preset threshold. The first preset threshold may be set according to actual needs, which will not be limited in the embodiments of the present disclosure. In another embodiment, the first face repair condition may be that there are noisy points, blurs or the like in the facial image to be optimized. The second face repair condition may be a condition for determining whether the brightness value of the facial image to be optimized satisfies the repair optimization. For example, the second face repair condition may be that the bright value of the facial image to be optimized is less than a second preset threshold or higher than a third preset threshold. The second preset threshold and the third preset threshold may also be set according to actual needs, which will not be limited in the embodiments of the present disclosure. The third face repair condition may be a condition for determining whether the facial expression of the facial image to be optimized satisfies the repair optimization. For example, the third face repair condition may be that the facial expression of the facial image to be optimized is distorted, or there is no smiling expression in the facial image to be optimized, or the like. The fourth face repair condition may be a condition for determining whether the five sense organs of the facial image to be optimized satisfy the repair optimization. For example, the fourth face repair condition may be that there is eye closure, eye semi-closure or the like in the facial image to be optimized. The fifth face repair condition may be a condition for determining whether the facial contour of the facial image to be optimized satisfies the repair optimization. For example, the fifth face repair condition may be that the facial contour of the facial image to be optimized is distorted or the like.

In some embodiments, when the feature value of the facial image to be optimized is being optimized according to the feature value of the reference facial image, if it is determined that the image resolution of the facial image to be optimized satisfies the first face repair condition, for example, when there are noisy points or blurs in the facial image to be optimized or the value of the image resolution dos not satisfy the requirements, the image resolution of the facial image to be optimized can be repaired according to the image resolution of the reference facial image. For example, the image resolution of the facial image to be optimized can be set as the image resolution of the reference facial image, and noise reduction, blur compensation, enhancement or the like is performed on the facial image to be optimized to realize the optimization of the image resolution of the facial image to be optimized. If it is determined that the brightness value of the facial image to be optimized satisfies the second face repair condition, for example, when the brightness of the facial image to be optimized is excessively high or excessively low, the brightness value of the facial image to be optimized can be adjusted according to the brightness value of the reference facial image. For example, the brightness value of the facial image to be optimized can be set as the brightness value of the reference facial image to realize the brightness balance adjustment of the facial image to be optimized. If it is determined that the facial expression of the facial image to be optimized satisfies the third face repair condition, for example, when the facial expression of the facial image to be optimized is distorted or there is no smiling expression in the facial image to be optimized, the facial expression of the facial image to be optimized can be repaired according to the facial expression of the reference facial image. For example, the smiling expression of the reference facial image is added to the facial image to be optimized to realize the adjustment of the facial expression to be optimized. If it is determined that the eye feature of the facial image to be optimized satisfies the fourth face repair condition, for example, when there is eye closure or eye semi-closure in the facial image to be optimized, the eye feature of the facial image to be optimized can be repaired according to the eye feature of the reference facial image. For example, the eye feature of the facial image to be optimized is adjusted according to the eye feature of the reference facial image to repair the eye closure and eye semi-closure in the facial image to be optimized. If it is determined that the facial contour of the facial image to be optimized satisfies the fifth face repair condition, for example, when there is distortion in the facial image to be optimized, the facial contour feature of the facial image to be optimized can be repaired according to the facial contour feature of the reference facial image. For example, the facial contour feature of the facial image to be optimized is adjusted according to the facial contour feature of the reference facial image to repair the face distortion in the facial image to be optimized.

Figure 2:
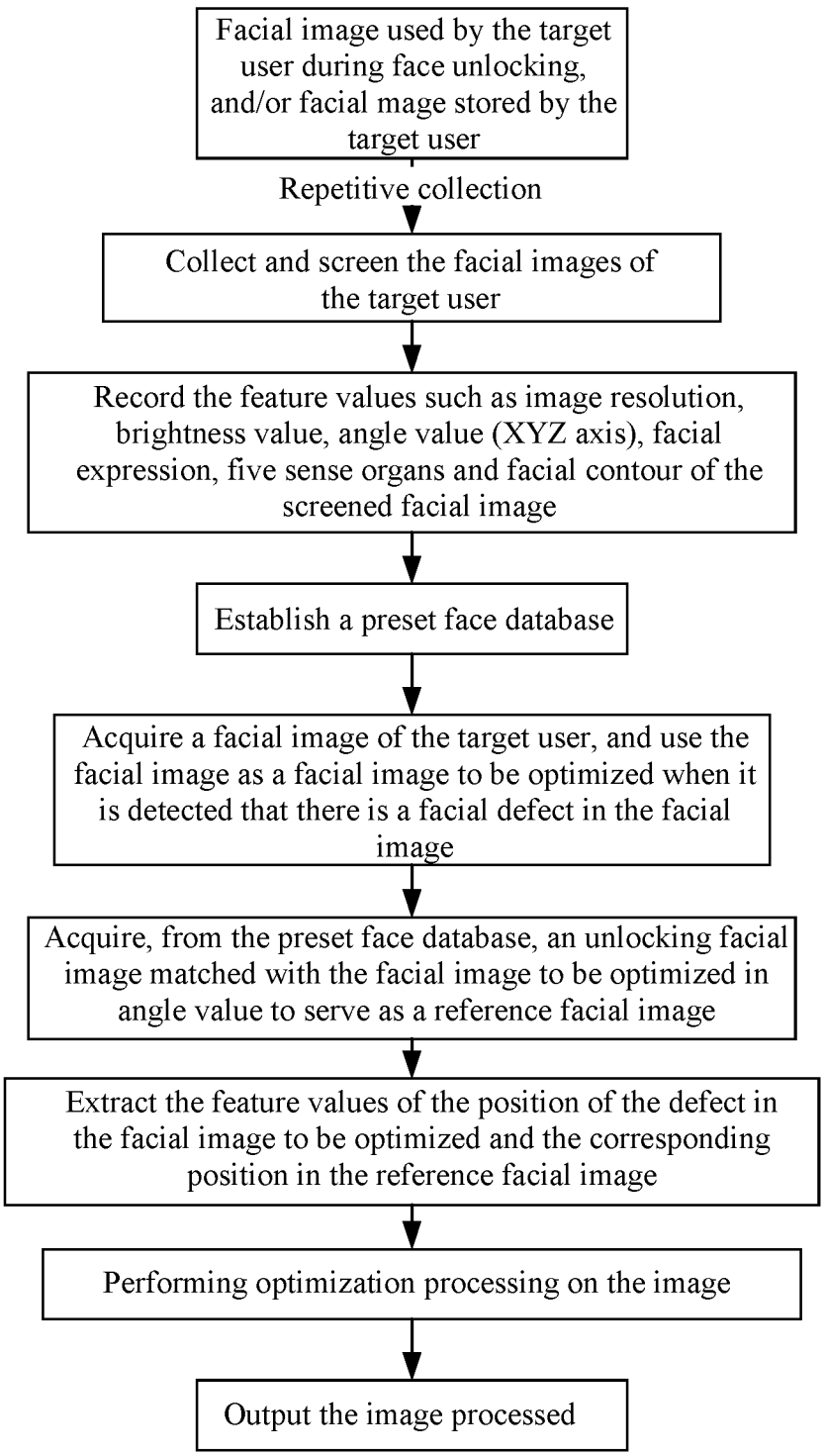
FIG. 2 is a schematic flowchart of a method for facial image processing according to another embodiment of the present disclosure.

FIG. 2 is a schematic flowchart of a method for facial image processing according to an embodiment of the present disclosure. In an example, as shown in FIG. 2, when a target user uses an intelligent terminal device, the unlocking facial image input into the intelligent terminal device by the target user during face unlocking and/or the facial image stored by the target user can be repetitively collected. The collected facial images are then screened, and the feature values such as image resolution, brightness value, angle value (XYZ axis), facial expression, five sense organs and facial contour of the screened facial image are recorded, thereby to establish a preset face database based on the collected facial images and the corresponding feature values. When the intelligent terminal device acquires a facial image captured or specified by the target user, a defect detection is performed on the acquired facial image, and the facial image is taken as a facial image to be optimized when it is determined that there are facial defects in the facial image. Then, the intelligent terminal device can acquire a facial image matched with the facial image to be optimized in terms of the angle value from the preset face database as a reference facial image, and extract the feature values of the position of the defect in the facial image to be optimized and the corresponding position in the reference facial image, so as to optimize the feature value of the position of the detect in the facial image to be optimized according to the feature value of the corresponding position in the reference facial image. Thus, the facial image to be optimized is optimized as the defect of the facial image to be optimized is corrected, and the optimized image is finally output to the target user. In the embodiment of the present disclosure, by acquiring a facial image to be optimized of a target user, acquiring a facial image matched with the facial image to be optimized from a preset face database as a reference facial image, and extracting the feature values of the reference facial image and the facial image to be optimized to optimize the feature value of the facial image to be optimized according to the feature value of the reference facial image, the problem that some defective facial images cannot be optimized by the existing intelligent terminal devices is at least partially solved, and the automatic optimization for the facial images having defects is realized.

Figure 3:
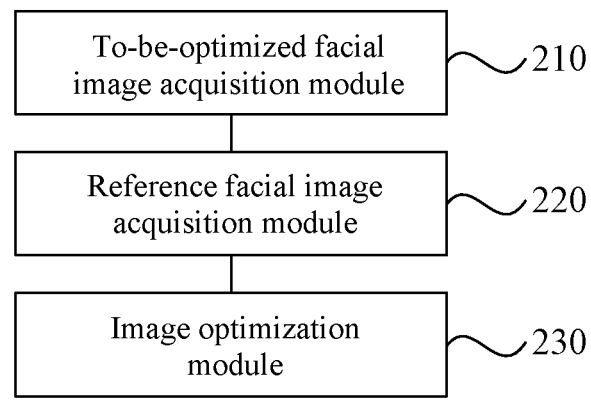
FIG. 3 is a schematic structural diagram of an apparatus for facial image processing according to an embodiment of the present disclosure.

According to the present disclosure, further provided is an apparatus for facial image processing. FIG. 3 is a schematic structural diagram of an apparatus for facial image processing according to an embodiment of the present disclosure. As shown in FIG. 3, the apparatus for facial image processing in the embodiment of the present disclosure may be integrated in an intelligent terminal device. The apparatus includes a to-be-optimized facial image acquisition module 210, a reference facial image acquisition module 220 and an image optimization module 230.

The to-be-optimized facial image acquisition module 210 is configured to acquire a facial image to be optimized of a target user.

The reference facial image acquisition module 220 is configured to acquire, from a preset face database, a reference facial image matched with the facial image to be optimized.

The image optimization image 230 is configured to optimize the facial image to be optimized according to the reference facial image.

In the embodiment of the present disclosure, by acquiring a facial image to be optimized of a target user, acquiring a facial image matched with the facial image to be optimized from a preset face database as a reference facial image and optimizing the facial image to be optimized according to the reference facial image, the problem that some defective facial images cannot be optimized by the existing intelligent terminal devices is at least partially solved, and the automatic optimization for defective facial images is realized.

In an embodiment, the reference facial image is an unlocking facial image used by the target user during face unlocking and/or a standard facial image stored by the target user. The apparatus further includes a preset face database establishment module. The preset face database establishment module is configured to acquire a facial image of the target user collected during face unlocking as the unlocking facial image; and/or, acquire a standard facial image of the target user used in comparison with the facial image collected for face unlocking as the unlocking facial image; acquire a standard facial image stored by the target user; and establish the preset facial database according to the unlocking facial image and/or the standard facial image stored by the target user.

In an embodiment, the preset face database establishment module is configured to screen the unlocking facial image and/or the standard facial image stored by the target user according to a facial image screening condition to obtain a facial image sample, and add the facial image sample to the preset face database. The facial image sample includes the unlocking facial image and/or the standard facial image stored by the target user and at least one feature value of the unlocking facial image and/or the standard facial image stored by the target user.

In an embodiment, the feature value includes an angle value. The reference facial image acquisition module 220 is configured to acquire a facial image matched with the facial image to be optimized in terms of the angle value from the preset face database according to the angle value of the facial image to be optimized, as the reference facial image.

In an embodiment, the image optimization module 230 is configured to extract feature values of the reference facial image and the facial image to be optimized, and to optimize the feature value of the facial image to be optimized according to the feature value of the reference facial image.

In an embodiment, the feature value further includes at least one of image resolution, brightness value, facial expression, five sense organs and facial contour. The image optimization module 230 is configured to: optimize the image resolution of the facial image to be optimized according to the image resolution of the reference facial image, optimize the brightness value of the facial image to be optimized according to the brightness value of the reference facial image, optimize the facial expression of the facial image to be optimized according to the facial expression of the reference facial image; optimize the five sense organs of the facial image to be optimized according to the five sense organs of the reference facial image, or, optimize the facial contour of the facial image to be optimized according to the facial contour of the reference facial image.

In an embodiment, the image optimization module 230 is configured to: repair the facial image to be optimized in terms of the image resolution according to the image resolution of the reference facial image when the image resolution of the facial image to be optimized satisfies a first face repair condition. The image optimization module 230 is further configured to repair the facial image to be optimized in terms of the brightness value according to the brightness value of the reference facial image when the brightness value of the facial image to be optimized satisfies a second face repair condition. The image optimization module 230 is further configured to repair the facial image to be optimized in terms of the facial expression according to the facial expression of the reference facial image when the facial expression of the facial image to be optimized satisfies a third face repair condition. The image optimization module 230 is further configured to repair the facial image to be optimized in terms of the eye feature according to the eye feature of the reference facial image when the eye feature of the facial image to be optimized satisfies a fourth face repair condition. The image optimization module 230 is further configured to repair the facial image to be optimized in terms of the facial contour according to the facial contour of the reference facial image when the facial contour of the facial image to be optimized satisfies a fifth face repair condition.

The apparatus for facial image processing can perform the method for facial image processing provided in the embodiments of the present disclosure and have the corresponding functional modules for executing the method and providing associated beneficial effects. For technical details which are not described in this embodiment, reference may be made to the method for facial image processing provided in any one of the embodiments of the present disclosure.

Since the apparatus for facial image processing described above could be an apparatus that execute the method for facial image processing according to the embodiments of the present disclosure, on the basis of the method for facial image processing described in the embodiments of the present disclosure, those having ordinary skill in the art can understand the specific implementations of the apparatus for facial image processing in this embodiment and various variations thereof. Therefore, how the apparatus for facial image processing implements the method for facial image processing according to the embodiments of the present disclosure will not be described in detail here. All apparatuses used by those having ordinary skill in the art to implement the method for facial image processing according to the embodiments of the present disclosure shall fall into the scope of the present disclosure.

Figure 4:
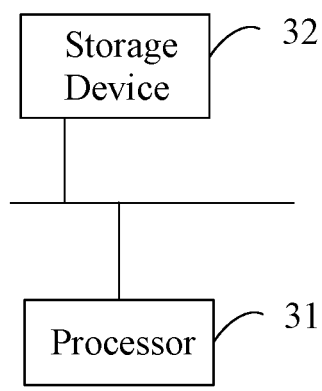
FIG. 4 is a schematic structural diagram of a computer device according to an embodiment of the present disclosure.

According to an embodiment of the present disclosure, provided is a computer device. FIG. 4 is a schematic structural diagram of the computer device according to the embodiment of the present disclosure. As shown in FIG. 4, the computer device according to the present disclosure includes at least one processor 31 and a storage device 32. The computer device may have one or more processors 31, in FIG. 4, one processor 31 is taken as an example. The storage device 32 is configured to store at least one programs which, when executed by the at least one processor 31, cause the at least one processor 31 to perform the method for facial image processing according to the embodiments of the present disclosure. The method includes acquiring a facial image to be optimized of a target user, acquiring a reference facial image matched with the facial image to be optimized from a preset face database, and optimizing the facial image to be optimized according to the reference facial image. In an embodiment, the computer device may be any type of intelligent terminal devices.

The processor 31 and the storage device 32 in the computer device may be connected via a bus or in other ways. In FIG. 4, the processor 31 and the storage device 32 being connected via a bus is taken as an example.

As a non-transitory computer-readable storage medium, the storage device 32 can be configured to store software programs, computer-executable programs and modules, for example, program instructions/modules (e.g., the to-be-optimized facial image acquisition module 210, the reference facial image acquisition module 220 and the image optimization module 230 in the apparatus for facial image processing) corresponding to the method for facial image processing according to the embodiments of the present disclosure. The storage device 32 may include a program storage region and a data storage region. The program storage region can store application programs required by the operating system and at least one function. The data storage region can store data created according to the use of the device, etc. In addition, the storage device 32 may include a high-speed random-access memory, and may also include a non-volatile memory, for example, at least one magnetic disk memory device, a flash memory device or other non-volatile solid-state memory devices. In some instances, the storage device 32 may further include memories remotely arranged relative to the processor 31. These remote memories may be connected to the computer device via a network. Examples of the network include, but not limited to, the Internet, Intranet, local area networks, mobile communication networks and combinations thereof.

According to an embodiment of the present disclosure, further provided is a non-transitory computer-readable storage medium. The non-transitory computer-readable storage medium stores thereon computer programs, when executed by a processor, cause the processor to perform the method for facial image processing described in any one of the embodiments of the present disclosure. The method includes acquiring a facial image to be optimized of a target user, acquiring a reference facial image matched with the facial image to be optimized from a preset face database, and optimizing the facial image to be optimized according to the reference facial image.

In the embodiment of the present disclosure, by acquiring a facial image to be optimized of a target user, acquiring a facial image matched with the facial image to be optimized as a reference facial image from a preset face database, and optimizing the facial image to be optimized according to the reference facial image, the problem that some defective facial images cannot be optimized by existing intelligent terminal devices is at least partially solved, and the automatic optimization for defective facial images is realized.

The non-transitory computer-readable storage medium according to the embodiment of the present disclosure may be any combination of one or more computer-readable mediums. The computer-readable medium may be a computer-readable signal medium or a computer-readable storage medium. For example, the computer-readable storage medium may be, but not be limited to: electrical, magnetic, optical, electromagnetic, infrared or semiconductor systems, apparatuses or devices, or any combination thereof. More specific examples (non-exhaustive list) of the computer-readable storage medium include: electrical connections having one or more leads, portable computer disks, hard disks, random access memories (RAMs), read only memories (ROMs), erasable programmable read only memories (EPROMs), optical fibers, portable compact disc read only memories (CD-ROMs), optical storage devices, magnetic storage devices or any suitable combination thereof. Herein, the computer-readable storage medium may be any tangible medium containing or storing programs that may be used by or used with an instruction execution system, apparatus or device.

The computer-readable signal medium may include data signals propagated in basebands or as part of carriers, in which computer-readable program codes are carried. The propagated data signals may be in various forms, including but not limited to electromagnetic signals, optical signals or any suitable combination thereof. The computer-readable signal medium may also be any computer-readable medium except for computer-readable storage mediums. The computer-readable medium can send, propagate or transmit programs for use by or use with an instruction execution system, apparatus or device.

The program codes contained in the computer-readable medium may be transmitted by any suitable medium, including but not limited to: wireless, wires, optical cables, radial frequency (RF), etc., or any suitable combination thereof.

The computer program codes for executing the operations of the present disclosure may be written in one or more programming languages or combinations thereof, including object-oriented programming languages such as Java, Smalltalk or C++, and conventional procedural programming languages such as "C" language or similar programming languages. The program codes may be executed entirely on the user's computer, partly on the user's computer, as a stand-alone software package, partly on the user's computer and partly on a remote computer, or entirely on a remote computer or server. In a scenario involving the remote computer, the remote computer may be connected to the user's computer through any type of networks, including local area networks (LANs) or wide area networks (WANs), or may be connected to an external computer (for example, through the Internet using an Internet service provider).

The foregoing description merely shows the illustrative embodiments of the present disclosure, and is not intended to limit the scope of the present disclosure.

It should be understood by those having ordinary skill in the art that, the term "terminal device" encompasses any suitable type of wireless user equipment, for example, mobile phones, portable data processing devices, portable web browsers or vehicle-mounted mobile stations.

Generally, various embodiments of the present disclosure can be implemented in hardware or dedicated circuits, software, logics or any combinations thereof. For example, some aspects may be implemented in hardware, while other aspects may be implemented in firmware or software that can be executed by a controller, a microprocessor or other computing apparatuses, although the present disclosure is not limited thereto.

The embodiments of the present disclosure may be implemented by executing computer program instructions by a data processor of a mobile device, for example, in processor entities, or by hardware, or by a combination of software and hardware. The computer program instructions may be assembly instructions, instruction set architecture (ISA) instructions, machine instructions, machine-related instructions, microcodes, firmware instructions, state setting data, or source codes or target codes written in any combination of one or more programming languages.

The block diagrams of any logic flow in the accompanying drawings of the present disclosure may represent program steps, or may represent interconnected logic circuits, modules and functions, or may represent combinations of program steps and logic circuits, modules and functions. The computer programs may be stored on a memory. The memory may be of any type suitable for the local technical environment and may be implemented by using any suitable data storage technology, for example, but not limited to, read-only memories (ROMs), random access memories (RAMs), optical memory devices and systems (digital video discs (DVDs) or compact disks (CDs)), etc. The computer-readable medium may include non-transient storage mediums. The data processor may be of any type suitable for the local technical environment, for example, but not limited to, general purpose computes, special purpose computers, microprocessors, digital signal processors (DSPs), application specific integrated circuits (ASICs), field-programmable gate arrays (FGPAs), and processors based on a multi-core processor architecture.

What is claimed is:

1. A method for facial image processing, performed by an intelligent terminal device, comprising:
   acquiring a first facial image to be optimized of a target user;
   according to an angle value of the first facial image to be optimized, acquiring a second facial image matched with the first facial image to be optimized in terms of the angle value from a preset facial database, as a reference facial image;
   extracting feature values of the reference facial image and the first facial image to be optimized, wherein the feature values comprise facial expression; and
   optimizing the feature values of the first facial image to be optimized according to the feature values of the reference facial image;
   wherein optimizing the feature values of the first facial image to be optimized according to the feature values of the reference facial image comprises:
   adding the facial expression of the reference facial image to the first facial image to be optimized;
   wherein the reference facial image is an unlocking facial image used by the target user for facial unlocking and/or a standard facial image stored by the target user, the unlocking facial image is an image involved in facial recognition unlocking, and the standard facial image stored by the target user is a facial image pre-acquired by the target user through the photographing function, downloading function or picture saving function, and used for image optimization; and
   before acquiring the second facial image matched with the first facial image to be optimized in terms of the angle value from the preset facial database, as the reference facial image, the method further comprises:
   acquiring a third facial image of the target user, which is captured during facial unlocking, as the unlocking facial image; and/or acquiring the standard facial image of the target user, which is used in comparison with the third facial image during facial unlocking, as the unlocking facial image;
   acquiring the standard facial image stored by the target user; and
   establishing the preset facial database according to the unlocking facial image and/or the standard facial image stored by the target user.

2. The method of claim 1, wherein establishing the preset facial database according to the unlocking facial image and/or the standard facial image stored by the target user comprises:
   screening the unlocking facial image and/or the standard facial image stored by the target user according to a facial image screening condition to obtain a facial image sample, the facial image sample comprising the unlocking facial image and/or the standard facial image stored by the target user and at least one feature value of the unlocking facial image and/or the standard facial image stored by the target user, wherein the facial image screening condition is a condition for screening the unlocking facial image and/or the standard facial image stored by the target user to obtain a high-quality facial image; and adding the facial image sample to the preset facial database.

3. The method of claim 1, wherein optimizing the feature values of the first facial image to be optimized according to the feature values of the reference facial image comprises:

in response to the facial expression of the first facial image to be optimized being distorted or no smiling expression in the first facial image to be optimized, adding the smiling expression of the reference facial image to the first facial image to be optimized.

4. A computer device, comprising:

at least one processor; and a storage device, configured to store at least one program;

wherein the at least one program, when executed by the at least one processor, cause the at least one processor to perform a method for facial image processing, performed by an intelligent terminal device, comprising:

acquiring a first facial image to be optimized of a target user;

according to an angle value of the first facial image to be optimized, acquiring a second facial image matched with the first facial image to be optimized in terms of the angle value from a preset facial database, as a reference facial image;

extracting feature values of the reference facial image and the first facial image to be optimized, wherein the feature values comprise facial expression; and optimizing the feature values of the first facial image to be optimized according to the feature values of the reference facial image;

wherein optimizing the feature values of the first facial image to be optimized according to the feature values of the reference facial image comprises:

adding the facial expression of the reference facial image to the first facial image to be optimized;

wherein the reference facial image is an unlocking facial image used by the target user for facial unlocking and/or a standard facial image stored by the target user, the unlocking facial image is an image involved in facial recognition unlocking, and the standard facial image stored by the target user is a facial image pre-acquired by the target user through the photographing function, downloading function or picture saving function, and used for image optimization; and before acquiring the second facial image matched with the first facial image to be optimized in terms of the angle value from the preset facial database, as the reference facial image, the method further comprises:

acquiring a third facial image of the target user, which is captured during facial unlocking, as the unlocking facial image; and/or acquiring the standard facial image of the target user, which is used in comparison with the third facial image during facial unlocking, as the unlocking facial image;

acquiring the standard facial image stored by the target user; and establishing the preset facial database according to the unlocking facial image and/or the standard facial image stored by the target user.

5. A non-transitory computer-readable storage medium having stored thereon computer programs which, when executed by a processor, cause the processor to perform a method for facial image processing, performed by an intelligent terminal device, comprising:

acquiring a first facial image to be optimized of a target user;

according to an angle value of the first facial image to be optimized, acquiring a second facial image matched with the first facial image to be optimized in terms of the angle value from a preset facial database, as a reference facial image;

extracting feature values of the reference facial image and the first facial image to be optimized, wherein the feature values comprise facial expression; and optimizing the feature values of the first facial image to be optimized according to the feature values of the reference facial image;

wherein optimizing the feature values of the first facial image to be optimized according to the feature values of the reference facial image comprises:

adding the facial expression of the reference facial image to the first facial image to be optimized;

wherein the reference facial image is an unlocking facial image used by the target user for facial unlocking and/or a standard facial image stored by the target user, the unlocking facial image is an image involved in facial recognition unlocking, and the standard facial image stored by the target user is a facial image pre-acquired by the target user through the photographing function, downloading function or picture saving function, and used for image optimization; and before acquiring the second facial image matched with the first facial image to be optimized in terms of the angle value from the preset facial database, as the reference facial image, the method further comprises:

acquiring a third facial image of the target user, which is captured during face facial unlocking, as the unlocking facial image; and/or acquiring the standard facial image of the target user, which is used in comparison with the captured third facial image during facial unlocking, as the unlocking facial image;

acquiring the standard facial image stored by the target user; and establishing the preset facial database according to the unlocking facial image and/or the standard facial image stored by the target user.

* * * * *